Patented Dec. 3, 1940

2,223,550

UNITED STATES PATENT OFFICE 2,223,550

CONDENSATION OF PINE OIL WITH A PHENOL HAVING AN UNSATURATED HYDROCARBON SIDE CHAIN

Mortimer T. Harvey, East Orange, N. J., assignor, by mesne assignments, to The Harvel Corporation, a corporation of New Jersey No Drawing. Application November 15, 1937, Serial No. 174,663

16 Claims. (Cl. 260—46)

The present invention relates to condensation products of pine oil and phenols having unsaturated hydrocarbon substituents on the nucleus thereof, and the present invention further relates to methods and steps for making the products of the invention and for using the same.

The primary products of the present invention are produced by the condensation of pine oil with a phenol having an unsaturated hydrocarbon substituent on the aromatic nucleus, with the aid of a condensing agent such as concentrated sulphuric acid, aluminum chloride, zinc chloride and their equivalents.

In order to expedite the heregoing disclosure of the present invention illustrative examples of aromatic nuclei and of unsaturated substituent radicles on the aromatic nuclei are given as follows. The aromatic nucleus can be phenyl, naphthyl, anthranyl, etc. The unsaturated hydrocarbon substituent can be those substituent radicles present in the anacardic acid and cardol constituents of cashew nut shell liquid; those present in anacardol ($C_{18}H_{30}O$) and the other aralykyl compounds present in marking nut shell liquid; the hydrocarbon substituent in urushiol (Japanese lac); the hydrocarbon substituent in indene; also the following radicles, the crotyl, allyl, the methyl derivative and other derivatives of the allyl, the vinyl, the propenyl, the isopropenyl and the several normal and iso alkyl and alkoxy derivatives of the vinyl, propenyl and allyl (e. g. methyl and methoxy), and the cyclohexene radicle. These radicles classed generally are aliphatic and cyclo unsaturated hydrocarbons, having an unsaturated bond at any place in the radicle.

Illustrative examples of the pine oil-phenol condensation products of the present invention are condensation products of pine oil with phenols having one or more of the unsaturated hydrocarbon radicles above enumerated; also condensation products of pine oil with cashew nut shell liquid; pine oil with cardanol ($HOC_6H_4C_{14}H_{27}$): pine oil with marking nut shell liquid; pine oil with di-ethylurushiol; and pine oil with those substituted phenols naturally occurring in the Anacardiaceae family generally and those obtainable by driving off the carboxyl radicle of carboxy phenolic compounds occurring in this family of trees and plants; pine oil with o-vinyl phenol ($HOC_6H_4CH:CH_2$); pine oil and o-allyl phenol; pine oil and ortho crotyl phenol; pine oil and para allyl phenol; pine oil and beta-allyl naphthol; pine oil and ortho cyclohexene phenol; pine oil and phenyl allyl phenol. Cardanol is a tetradecylene phenol obtainable by the steam distillation of cashew nut shell liquid at about 270° C. and at atmospheric pressure, for example, as described in U. S. Patent Number 2,181,119, issued November 28, 1939.

*Example 1.*—A condensation product is obtained by reacting equimolecular proportions of cashew nut shell liquid and pine oil with a mol of concentrated sulphuric acid added slowly while maintaining the mixture at a temperature below 25° C. This condensation product is washed free of sulphuric acid and dehydrated as by heating at about 120° C. The condensation product can be further condensed with an aldehyde such as formaldehyde, hexamethylene tetramine, furfuraldehyde, paraformaldehyde and so on.

Also the pine oil-cashew nut shell liquid condensation product can be polymerized by heating to about 500° F. with five per cent of its weight of tributyl phosphate and holding at that temperature for about one to one and one-half hours. The resulting condensation product is a heavy-bodied liquid which is suitable for use in various ways, as for example, by condensing with an aldehyde such as one or more of those given above as examples. Acid, alkaline, or ammonia, catalyst can be used in the condensations with the aldehydes above cited.

An example of such use is to mix a quantity of the heavy-bodied condensation product above described with about six per cent of its weight of paraformaldehyde and left to stand at room temperature overnight, the result being a condensation product which is a soft rubber-like infusible mass that retains its softness even when heated up to 325° F. This latter product has good aging properties and good adhesion to metal, wood, etc., and is valuable as a bonding material for adhering rubber, cashew nut shell liquid coatings and other protective coatings to the inside of tanks and so on.

*Example 2.*—In another method cashew nut shell liquid is polymerized to an intermediate state, that is to a thick liquid, as by the method of the Harvey and Damitz Patent #2,067,919. This polymerized cashew nut shell liquid is then condensed with about equimolecular proportions of pine oil by the method of Example 1 above. The condensation product is useful, for example, for the purposes set forth in said Example 1.

*Example 3.*—In another example the procedure is substantially the same as in Example 1 except that equimolecular proportions of cardanol and pine oil are used in place of cashew nut shell liquid and pine oil. And the cardanol-pine oil condensation can be polymerized and can be condensed with an aldehyde either in the polymerized or unpolymerized states.

In the above examples of the polymerization of condensation products of pine oil and phenols having unsaturated nuclear substituents, alkyl phosphates have been disclosed as the polymerization agents but the other polymerizing agents above mentioned can be used. For example, instead of the alkyl phosphates used in each of the Examples 1 to 3, above, concentrated sulphuric acid can be used in amount from less than one-half of one per cent to about ten per cent of the weight of the pine oil-phenol condensation product and, for example in a temperature range between about 250° F. to about 350° F. for various periods of time from, for example, one-half hour to twenty-four hours to get polymerization products of various consistencies ranging from thin liquids through viscous liquids, ropy or stringy plastic states, to rubber like consistencies, to suit various uses.

The phenols having unsaturated side chains useful in the practice of the present invention are intended to include distillates and residues obtained by the steam or vacuum or other distillation of cashew nut shell liquid, marking nut shell liquid, urushiol and so on.

The condensation products of the present invention, that is condensation products of pine oil with a phenol having an unsaturated side chain, are suitable for various uses, for illustrative example, they can be partially condensed with formaldehyde or polymerized with an agent such as sulphuric acid and, after being neutralized if necessary, added to oils and varnishes in the usual and well known methods of making varnishes and the like to obtain oil proofness and flexibility in coatings for metal, cloth, paper and so on.

Also the products of the present invention can be completely reacted to the rubbery state as by condensation with formaldehyde or by polymerization with a polymerizing agent such as sulphuric acid or by a combination of both these methods and the rubbery product milled into rubber in the usual manner to impart oil proofness and corona resistance in the use of the rubber so compounded as electrical insulation.

The products of the present invention can be incorporated, by means of mixing on a rubber mill or by means of common solvents, with ethers of cellulose such as the methyl, ethyl, propyl and butyl ethers to give tough rubbery masses which can be more easily extruded through dies and which have increased water resistance and flexibility.

The products of the present invention can be incorporated in phenol-aldehyde type resins to impart flexibility.

The pine oil-unsaturated hydrocarbon phenol condensation products of the present invention can also be made from the phenolic residue obtained when cashew nut shell liquid is destructively distilled to obtain cardanol and from other phenolic residues obtained upon the distillation of cashew nut shell liquid, marking nut shell liquid, urushiol and other Anacardiaceae phenols having unsaturated hydrocarbon side chain on the nucleus thereof.

Having thus described my invention, what I claim and desire to protect by Letters Patent is—

1. The method which comprises condensing pine oil with cashew nut shell liquid with the aid of a condensing agent selected from the group consisting of sulphuric acid, aluminum chloride and zinc chloride.

2. The method which comprises condensing pine oil with a phenol derived from and having a characteristic unsaturated hydrocarbon side chain of the flora family Anacardiaceae, with the aid of a condensing agent selected from the group consisting of sulphuric acid, aluminum chloride and zinc chloride.

3. The method which comprises condensing pine oil with cashew nut shell liquid with the aid of a condensing agent selected from the group consisting of sulphuric acid, aluminum chloride and zinc chloride, polymerizing the condensation product, and condensing an aldehyde with the polymerization product.

4. The method which comprises condensing pine oil with a phenol derived from and having the characteristic unsaturated hydrocarbon side chain of the flora family Anacardiaceae, with the aid of a polymerizing agent selected from the group consisting of sulphuric acid, aluminum chloride and zinc chloride, polymerizing the condensation product, and condensing an aldehyde with the polymerization product.

5. The method which comprises polymerizing cashew nut shell liquid and condensing the polymerization product with pine oil with the aid of a condensing agent selected from the group consisting of sulphuric acid, aluminum chloride and zinc chloride.

6. The method which comprises condensing pine oil with a phenol having an unsaturated hydrocarbon side chain selected from the group consisting of open chain and alicyclic radicals, with the aid of a condensing agent selected from the group consisting of sulphuric acid, aluminum chloride and zinc chloride.

7. The method which comprises condensing pine oil with a phenol having an unsaturated hydrocarbon side chain selected from the group consisting of open chain and alicyclic radicals, with the aid of a condensing agent selected from the group consisting of sulphuric acid, aluminum chloride and zinc chloride, and polymerizing the resulting condensation product.

8. The condensation product of pine oil and a phenol having an unsaturated hydrocarbon side chain selected from the group consisting of open chain and alicyclic radicals.

9. A product in which pine oil has been condensed with a phenol having an unsaturated hydrocarbon side chain selected from the group consisting of open chain and alicyclic radicals, and in which polymerization has been brought about at said unsaturated side chain.

10. The condensation product of pine oil and a phenol derived from and having a characteristic unsaturated hydrocarbon side chain of the flora family Anacardiaceae.

11. A product in which pine oil has been condensed with a phenol derived from and having a characteristic unsaturated hydrocarbon side chain of the flora family Anacardiaceae, and in which polymerization has been brought about at said unsaturated hydrocarbon side chain.

12. The condensation product of pine oil and cashew nut shell liquid.

13. The condensation product of pine oil and cardanol.

14. A product in which pine oil has been condensed with cashew nut shell liquid and polymerization has been brought about at the unsaturated hydrocarbon side chain of said cashew nut shell liquid.

15. A product in which pine oil has been condensed with cardanol and polymerization has been brought about at the unsaturated hydrocarbon side chain of said cardanol.

16. A product in which pine oil has been condensed with a phenol selected from the group consisting of cashew nut shell liquid and phenols derived from and having the characteristic hydrocarbon side chain of cashew nut shell liquid and in which the resulting phenol has been condensed with an aldehyde.

MORTIMER T. HARVEY.